United States Patent
Ji et al.

(10) Patent No.: US 9,650,782 B2
(45) Date of Patent: May 16, 2017

(54) EXTERIOR INSULATION MORTAR FOR COLD WEATHER AND METHOD FOR CONSTRUCTING EXTERIOR INSULATION SYSTEM USING SAME

(71) Applicant: LG Hausys, Ltd., Seoul (KR)

(72) Inventors: Seung Wook Ji, Yeosu-si (KR); Eung Kee Lee, Anyang-si (KR); Chul June Choi, Daejeon (KR); Myeong Hee Kim, Anyang-si (KR); Ji Mun Kim, Seoul (KR); Byung Joo Jeon, Seoul (KR)

(73) Assignee: LG HAUSYS, LTD., Seoul (KR)

( * ) Notice: Subject to any disclaimer, the term of this patent is extended or adjusted under 35 U.S.C. 154(b) by 63 days.

(21) Appl. No.: 14/761,621

(22) PCT Filed: Dec. 3, 2013

(86) PCT No.: PCT/KR2013/011081
§ 371 (c)(1),
(2) Date: Sep. 13, 2015

(87) PCT Pub. No.: WO2014/112717
PCT Pub. Date: Jul. 24, 2014

(65) Prior Publication Data
US 2015/0376896 A1  Dec. 31, 2015

(30) Foreign Application Priority Data

Jan. 18, 2013 (KR) .................. 10-2013-0006118

(51) Int. Cl.
| | | |
|---|---|---|
| *C04B 28/02* | (2006.01) | |
| *E04B 1/78* | (2006.01) | |
| *C04B 28/06* | (2006.01) | |
| *C04B 28/04* | (2006.01) | |
| *E04B 1/76* | (2006.01) | |
| *E04F 13/04* | (2006.01) | |
| *C04B 111/28* | (2006.01) | |
| *C04B 111/00* | (2006.01) | |
| *C04B 111/76* | (2006.01) | |

(52) U.S. Cl.
CPC .............. *E04B 1/78* (2013.01); *C04B 28/02* (2013.01); *C04B 28/04* (2013.01); *C04B 28/06* (2013.01); *E04B 1/7625* (2013.01); *E04F 13/045* (2013.01); *C04B 2111/00482* (2013.01); *C04B 2111/28* (2013.01); *C04B 2111/76* (2013.01)

(58) Field of Classification Search
CPC  C04B 7/02; C04B 14/06; C04B 14/28; C04B 22/124; C04B 24/04; C04B 24/2623; C04B 24/2641; C04B 24/383; C04B 28/02; C04B 28/04; C04B 28/06; C04B 2103/12; C04B 2111/28; C04B 2111/76; C04B 2111/00482; E04B 1/7625; E04B 1/78; E04F 13/045
See application file for complete search history.

(56) References Cited

U.S. PATENT DOCUMENTS

| | | | | |
|---|---|---|---|---|
| 4,070,199 A | * | 1/1978 | Downing | C04B 28/06 106/696 |
| 6,384,141 B2 | * | 5/2002 | Hirata | C04B 24/2647 106/729 |
| 7,588,635 B2 | * | 9/2009 | Yamakawa | C04B 28/02 106/172.1 |
| 7,662,884 B2 | * | 2/2010 | Yuasa | C04B 24/26 525/178 |
| 2006/0169183 A1 | * | 8/2006 | Waser | C04B 28/04 106/802 |
| 2008/0196629 A1 | * | 8/2008 | Yamakawa | C04B 28/02 106/730 |
| 2009/0131560 A1 | * | 5/2009 | Ono | C04B 24/2647 524/5 |
| 2010/0190888 A1 | | 7/2010 | Gaeberlein et al. | |
| 2012/0220696 A1 | * | 8/2012 | Nicoleau | C04B 40/0039 524/3 |
| 2012/0270969 A1 | * | 10/2012 | Bichler | C04B 28/04 524/5 |
| 2012/0315489 A1 | * | 12/2012 | Hohn | C04B 24/383 428/423.5 |
| 2014/0171553 A1 | * | 6/2014 | Wunderlich | C04B 20/00 524/5 |
| 2015/0376896 A1 | * | 12/2015 | Ji | C04B 28/02 156/71 |

FOREIGN PATENT DOCUMENTS

| | | | |
|---|---|---|---|
| CN | 102173662 A | | 9/2011 |
| CN | 102216234 A | | 10/2011 |
| CN | 102603249 A | * | 7/2012 |
| CN | 103043974 A | * | 4/2013 |
| CN | 103058616 A | * | 4/2013 |
| CN | 103936370 A | * | 7/2014 |
| DE | 102006038743 A1 | * | 2/2008 |
| EP | 0211752 A1 | | 2/1987 |
| JP | 2011195403 A | | 10/2011 |
| KR | 20100046006 A | | 5/2010 |
| KR | 101006890 B1 | | 1/2011 |
| KR | 101016265 B1 | | 2/2011 |
| KR | 101073843 B1 | | 10/2011 |
| WO | 2010031206 A1 | | 3/2010 |
| WO | 2012170666 A1 | | 12/2012 |
| WO | 2013040788 A1 | | 3/2013 |

OTHER PUBLICATIONS

International Search Report for PCT/KR2013/011081 mailed on Mar. 10, 2014.
European Extended Search Report dated Jan. 26, 2016 in connection with the counterpart European Patent Application No. 13871899.4.

* cited by examiner

*Primary Examiner* — Anthony J Green
(74) *Attorney, Agent, or Firm* — Hauptman Ham, LLP

(57) ABSTRACT

Disclosed are an exterior insulation mortar for cold weather which may prevent freezing and improve strength at temperatures below 0° C., and an exterior insulation system using the same.

8 Claims, 1 Drawing Sheet

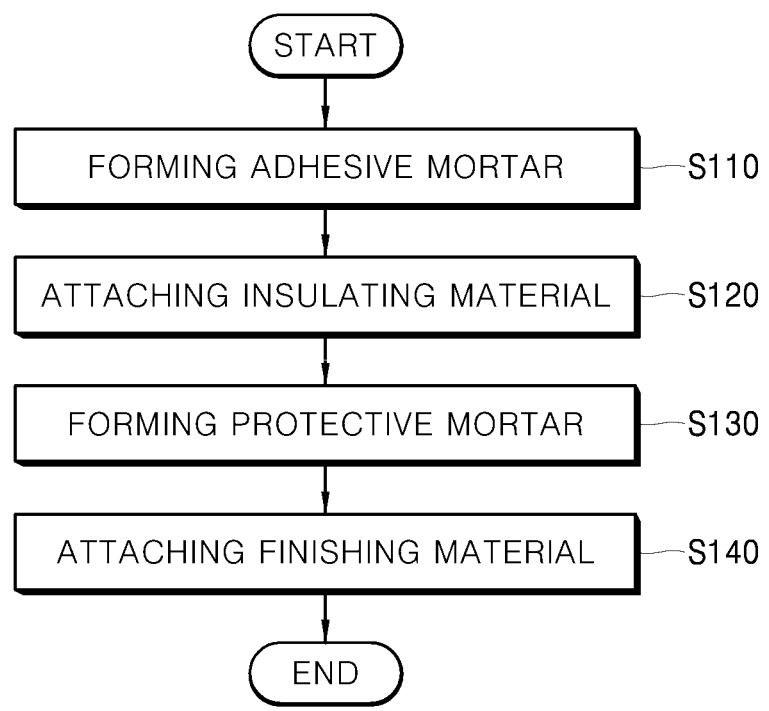

EXTERIOR INSULATION MORTAR FOR COLD WEATHER AND METHOD FOR CONSTRUCTING EXTERIOR INSULATION SYSTEM USING SAME

CROSS REFERENCE TO RELATED APPLICATION

This application claims the priority of Korean Patent Application No. 10-2013-0006118, filed Jan. 18, 2013 in the KIPO (Korean Intellectual Property Office). Further, this application is the National Phase application of International Application No. PCT/KR2013/011081 filed Dec. 3, 2013, which designates the United States and was published in Korean.

TECHNICAL FIELD

The present disclosure relates to an exterior insulation mortar for cold weather and an exterior insulation system comprising the same. More specifically, the present disclosure relates to an exterior insulation mortar for cold weather, which can prevent freezing and improve strength at temperatures below 0° C. due to a rapid curing reaction and a high heat of hydration by mixing Portland cement with an alumina cement and a rapid hardening portland cement, and an exterior insulation system comprising the same.

BACKGROUND ART

An exterior insulation system is structured in the order of concrete walls, an adhesive mortar, an insulating material, a protective mortar, and a finishing material. Among these components, the adhesive mortar and the protective mortar, which are an exterior insulation mortar, play a key role in maintaining the durability of the exterior insulation system.

The currently used exterior insulation mortars in the exterior insulation system generally employ a cement-based mortar, which is known to be highly influenced by temperature and humidity on the construction. Since the application temperature range of such exterior insulation mortar is approximately 4 to 35° C., the exterior insulation mortars have many limitations at a temperature below zero in winter. For example, the construction of mortar is impossible in the sub-zero temperature condition of the winter season due to freezing of water in the exterior insulation mortar.

However, in the current domestic construction, it is required to construct the exterior insulation system at the temperature of below zero, which lowers in quality of the exterior insulation system and causes various defects.

The related prior publication, Korean Patent Registration No. 10-1073843 (published on Oct. 14, 2011), discloses a method for insulation of an outer wall of building using aqueous soft foam.

DISCLOSURE

Technical Problem

An aspect of the present disclosure is to provide an exterior insulation mortar for cold weather, which can prevent freezing and improve strength at temperatures below 0° C. due to a rapid curing reaction and a high heat of hydration by mixing Portland cement with an alumina cement and a rapid hardening portland cement, and an exterior insulation system comprising the same.

Technical Solution

In accordance with one aspect of the present disclosure, there is provided an exterior insulation mortar for cold weather comprising 27 to 30 wt % of Portland cement, 1 to 3 wt % of an alumina cement, 1 to 3 wt % of a rapid hardening portland cement, 40 to 50 wt % of quartz sand, 12 to 16 wt % of calcium carbonate, 5 to 7 wt % of a polymer binder, 0.2 to 0.8 wt % of a cement curing-accelerator, 0.3 to 0.7 wt % of a cement curing-acceleration aid, 0.15 to 0.25 wt % of methyl cellulose, and 0.1 to 0.2 wt % of methyl ethyl cellulose.

In accordance with another aspect of the present disclosure, there is provided method for constructing an exterior insulation system for cold weather, comprising the steps of forming an adhesive mortar by coating an adhesive mortar composition on an outer wall of concrete walls, followed by curing; attaching an insulating material to the outer wall of concrete walls by the adhesive mortar; and forming an protective mortar by coating an protective composition on the outer wall of the insulating material, followed by curing, wherein the adhesive mortar and the protective mortar each comprises 27 to 30 wt % of Portland cement, 1 to 3 wt % of an alumina cement, 1 to 3 wt % of a rapid hardening portland cement, 40 to 50 wt % of quartz sand, 12 to 16 wt % of calcium carbonate, 5 to 7 wt % of a polymer binder, 0.2 to 0.8 wt % of a cement curing-accelerator, 0.3 to 0.7 wt % of a cement curing-acceleration aid, 0.15 to 0.25 wt % of methyl cellulose, and 0.1 to 0.2 wt % of methyl ethyl cellulose.

Advantageous Effects

The exterior insulation mortar according to the present disclosure and an exterior insulation system using the same, can prevent freezing and improve strength at temperatures below 0° C. due to a rapid curing reaction and a high heat of hydration by mixing Portland cement with an alumina cement and a rapid hardening portland cement.

Further, according to a preferred embodiment of the present disclosure, the exterior insulation mortar and the exterior insulation system using the same further comprises calcium chloride as a cement curing-accelerator and calcium formate as a cement curing-acceleration aid, which accelerate complex formation between cement and polymer and make the construction of mortar possible even at a temperature of below zero (less than 0° C.), thereby solving degradation of construction reliability even in winter.

DESCRIPTION OF DRAWINGS

FIG. 1 is a process flowchart showing the construction method of an exterior insulation system according to a preferred embodiment of the present disclosure.

BEST MODE

Advantages and features of the present disclosure and methods to achieve them will become apparent from the descriptions of exemplary embodiments herein below with reference to the accompanying drawings. However, the present disclosure is not limited to exemplary embodiments disclosed herein but may be implemented in various different ways. The exemplary embodiments are provided for making the disclosure of the present disclosure thorough and for fully conveying the scope of the present disclosure to those skilled in the art. It is to be noted that the scope of the present disclosure is defined only by the claims. Like reference numerals denote like elements throughout the descriptions.

Hereinafter, an exterior insulation mortar for cold weather according to a preferred embodiment of the present disclosure and an exterior insulation system comprising the same will be described in detail.

The exterior insulation mortar for cold weather according to a preferred embodiment of the present disclosure comprises Portland cement, an alumina cement, a rapid hardening portland cement, quartz sand, calcium carbonate, a polymer binder, a cement curing-accelerator, a cement curing-acceleration aid, methyl cellulose, and methyl ethyl cellulose.

Portland cement is generally produced by pulverizing clinkers after a quantity of gypsum is added thereto for controlling setting time, wherein clinkers are prepared by grinding a mixture of calcareous raw material and clayey material in the proper proportion, followed by sintering until a portion begin to melt. Portland cement may be comprised of lime (CaO), silica ($SiO_2$), alumina ($Al_2O_3$), iron oxide ($Fe_2O_3$), etc.

Preferably, Portland cement is added in a content of 27-30 wt % of the total weight of the exterior insulation mortar according to the present disclosure. When a content of the Portland cement is less than 27 wt % of the total weight of the exterior insulation mortar, it may be difficult to achieve a sufficient stiffness. On the contrary, when a content of the Portland cement exceeds 30 wt % of the total weight of the exterior insulation mortar, there is concern about an increase of manufacturing cost without any additional advantageous effects and thus is uneconomical.

The alumina cement used for enhancing a chemical resistance and a strength, may be comprised of alumina, quick lime (CaO), silicic acid anhydride, etc.

Preferably, the alumina cement is added in a content of 1-3 wt % of the total weight of the exterior insulation system for cold weather according to the present disclosure. When a content of the alumina cement is less than 1 wt % of the total weight of the exterior insulation system for cold weather, it may be difficult to achieve a sufficient chemical resistance and strength. On the contrary, when a content of the alumina cement exceeds 3 wt % of the total weight of the exterior insulation system for cold weather, it may cause an excessive increase of the stiffness due to the increase of the total amount of cements, which results in defects such as crack.

The rapid hardening portland cement generates a higher heat in comparison with Portland cement due to its rapid reaction of hydration, thereby enhancing the curing and the strength.

Preferably, the rapid hardening portland cement is added in a content of 1-3 wt % of the total weight of the exterior insulation mortar for cold weather according to the present disclosure. When a content of the alumina cement is less than 1 wt % of the total weight of the exterior insulation mortar for cold weather, it may have poor effect on an enhancement of the curing and the strength. On the contrary, when a content of the alumina cement exceeds 3 wt % of the total weight of the exterior insulation mortar for cold weather, there is concern about an excessive manufacturing cost for only a slight enhancement of the curing and the strength and thus is uneconomical. Such high content may also raise the occurrence of crack due to an excessive increase of stiffness on the curing.

The quartz sand is added for the purpose of enhancing the surface roughness of the mortar after construction. Preferably, the quartz sand has an average diameter of approximately 0.01-0.30 mm. When an average diameter of the quartz sand is less than 0.01 mm, an enhancement of surface roughness may be relatively small in comparison with the time and cost spent to obtain such fine particles and thus is uneconomical. On the contrary, when an average diameter of the quartz sand exceeds 0.30 mm, it may be difficult to achieve a sufficient surface roughness, and the crack resistance may deteriorate drastically.

Preferably, the quartz sand is added in a content of 40-50 wt % of the total weight of the exterior insulation mortar for cold weather according to the present disclosure. When a content of the quartz sand is less than 40 wt % of the total weight of the exterior insulation mortar for cold weather, it may be difficult to achieve a sufficient surface roughness. On the contrary, when a content of the quartz sand exceeds 50 wt % of the total weight of the exterior insulation mortar for cold weather, there is concern about an increase of manufacturing cost without any additional advantageous effects and thus is uneconomical.

Calcium carbonate ($CaCO_3$) is added as a fine particle filler since it is not soluble in water but forms a precipitate in an aqueous solution. Calcium carbonate is added to bring into uniformity of particle size of the exterior insulation mortar for cold weather according to the present disclosure when it mixed with water as a solvent, thereby making overall manufacturing process smooth. A suitable particle size of calcium carbonate is 80-100 mesh.

Preferably, calcium carbonate is added in a content of 12-16 wt % of the total weight of the exterior insulation mortar for cold weather according to the present disclosure. When a content of calcium carbonate is less than 12 wt % of the total weight of the exterior insulation mortar for cold weather, it may be difficult to achieve a sufficient particle size distribution. On the contrary, when a content of calcium carbonate exceeds 16 wt % of the total weight of the exterior insulation mortar for cold weather, there is concern about an increase of manufacturing cost without any additional advantageous effects.

The polymer binder forms a polymer film by curing reaction with cements after construction. The curing reaction produces an organic-inorganic complex of polymer and cements, which enhances the water resistance and improves the durability and the impact resistance since the dry shrinkage is reduced by filling the voids in cements The polymer binder may comprise at least one selected from the group consisting of an acrylic resin, an EVA (ethylene vinyl acetate) resin, a polymer emulsion and the like.

Preferably, the polymer binder is added in a content of 5-7 wt % of the total weight of the exterior insulation mortar for cold weather according to the present disclosure. Such a high content of the polymer binder in comparison with a typical content is for compensating the stiffness increased by inorganic materials such as Portland cement, the alumina cement, the rapid hardening portland cement and the quartz sand and for improving an adhesion to concrete walls and insulation materials on construction.

When a content of the polymer binder is less than 5 wt % of the total weight of the exterior insulation mortar for cold weather, it may be difficult to achieve the above-mentioned advantageous effects sufficiently. On the contrary, when a content of the polymer binder exceeds 7 wt % of the total weight of the exterior insulation mortar for cold weather, there is concern about poor constructability due to an excessive adhesion.

The cement curing-accelerator lowers the freezing point and accelerates complex formation between cements and polymer, thereby making the construction of mortar possible even at a temperature of below zero. For example, calcium chloride may be used as the cement curing-accelerator.

Preferably, the cement curing-accelerator is added in a content of 0.2-0.8 wt % of the total weight of the exterior insulation mortar for cold weather according to the present disclosure. When a content of the cement curing-accelerator is less than 0.2 wt % of the total weight of the exterior insulation mortar for cold weather, it may have poor effect on acceleration of the curing of cement and be difficult to accelerate the complex formation between cements and polymer sufficiently, resulting in poor effect on lowering the freezing point. On the contrary, when a content of the cement curing-accelerator exceeds 0.8 wt % of the total weight of the exterior insulation mortar for cold weather, it is expected to require an excessive manufacturing cost for only a slight enhancement of the curing and the strength and thus is uneconomical.

A cement curing-acceleration aid assists a cement curing-accelerator for lowering the freezing point and improves the strength of the cements on mixing. For example, calcium formate may be used as the cement curing-acceleration aid.

Preferably, the cement curing-acceleration aid is added in a content of 0.3-0.7 wt % of the total weight of the exterior insulation mortar for cold weather according to the present disclosure. When a content of the cement curing-acceleration aid is less than 0.3 wt % of the total weight of the exterior insulation mortar for cold weather, it may be unable to contribute to the strength improvement. On the contrary, when a content of the cement curing-acceleration aid exceeds 0.7 wt % of the total weight of the exterior insulation mortar for cold weather, there is concern about not dissolving in water.

Methyl cellulose, a kind of alkyl cellulose, increases viscosity under alkali condition, thereby giving adhesiveness and a moisturizing ability. Therefore, methyl cellulose stabilizes a re-dispersible polymer powder and improves dispersion thereof.

However, when methyl cellulose is used alone, it may cause deterioration of constructability as the content increases. For this reason, methyl ethyl cellulose, which will be described below, is subsidiarily used to prevent drastic deterioration of constructability and improve the adhesive property and the long term endurance.

Preferably, methyl cellulose is added in a content of 0.15-0.25 wt % of the total weight of the exterior insulation mortar for cold weather according to the present disclosure. When a content of methyl cellulose is less than 0.15 wt % of the total weight of the exterior insulation mortar for cold weather, it may be difficult to achieve the above-mentioned advantageous effects sufficiently. On the contrary, when a content of the methyl cellulose exceeds 0.25 wt % of the total weight of the exterior insulation mortar for cold weather, it may cause an excessive adhesiveness and stickiness, resulting in deterioration of constructability.

Methyl ethyl cellulose is added for the purpose of preventing drastic deterioration of constructability which results from the increase of the amount of methyl cellulose.

Preferably, methyl ethyl cellulose is added in a content of 0.1-0.2 wt % of the total weight of the exterior insulation mortar for cold weather according to the present disclosure. When a content of methyl ethyl cellulose is less than 0.1 wt % of the total weight of the exterior insulation mortar for cold weather, it may be difficult to achieve a sufficient effect on preventing deterioration of constructability. On the contrary, when a content of the methyl ethyl cellulose exceeds 0.2 wt % of the total weight of the exterior insulation mortar for cold weather, there is concern about an excessive manufacturing cost for only a slight enhancement of the curing and the strength and thus is uneconomical. Moreover, such high content may cause a tagging phenomenon due to a lowering of viscosity.

As described above, the exterior insulation mortar for cold weather according to an embodiment of the present disclosure and an exterior insulation system using the same, can prevent freezing and improve strength at temperatures below 0° C. due to a rapid curing reaction and a high heat of hydration by mixing Portland cement with an alumina cement and a rapid hardening portland cement.

Further, according to a preferred embodiment of the present disclosure, the exterior insulation mortar further comprises calcium chloride as a cement curing-accelerator and calcium formate as a cement curing-acceleration aid, which accelerate complex formation between cement and polymer and makes the construction of mortar possible even at a temperature of below zero (less than 0° C.), thereby attaining reliability of quality in winter.

FIG. 1 is a process flowchart showing a construction method of the exterior insulation system according to an embodiment of the present disclosure.

As shown in FIG. 1, the construction method of the exterior insulation system for cold weather according to an embodiment of the present disclosure comprises the steps of forming an adhesive mortar (S110), attaching an insulating material (S120), and forming a protective mortar (S130). In addition, the construction method of the exterior insulation system for cold weather according to an embodiment of the present disclosure, may further comprise the step of attaching a finishing material (S140).

Formation of Adhesive Mortar

In the step of forming an adhesive mortar (S110), an adhesive mortar composition is coated on an outer wall of concrete walls and is cured to form an adhesive mortar.

Attachment of Insulating Material

In the step of attaching an insulating material (S120), an insulating material is attached to the outer wall of concrete walls by the adhesive mortar.

Formation of Protective Mortar

In the step of forming a protective mortar (S130), an adhesive mortar composition is coated on the outer wall of the insulating material and is cured to form a protective mortar.

The above-mentioned adhesive mortar and the protective mortar are each comprised of 27 to 30 wt % of Portland cement, 1 to 3 wt % of an alumina cement, 1 to 3 wt % of a rapid hardening portland cement, 40 to 50 wt % of quartz sand, 12 to 16 wt % of calcium carbonate, 5 to 7 wt % of a polymer binder, 0.2 to 0.8 wt % of a cement curing-accelerator, 0.3 to 0.7 wt % of a cement curing-acceleration aid, 0.15 to 0.25 wt % of methyl cellulose, and 0.1 to 0.2 wt % of methyl ethyl cellulose.

Accordingly, the adhesive mortar and the protective mortar used in the construction method according to an embodiment of the present disclosure, are each comprised of the same materials as those of the above-mentioned exterior insulation mortar.

The adhesive mortar composition and the protective mortar composition may be used in the construction method as an aqueous mixture wherein the weight ratio of solid to solvent (water) is 3:1 to 8:1.

Meanwhile, in the step of attaching a finishing material (S140), a finishing material is attached to the outer wall of the protective mortar. Although the step of attaching a finishing material (S140) does not have to be conducted for the construction, it is preferred to be performed since a finishing material applied on the outermost wall enhances the exterior appearance.

The construction method of the exterior insulation system comprising the above-mentioned steps (S110-S140), can prevent freezing and improve strength at temperatures below 0° C. due to a rapid curing reaction and a high heat of hydration by mixing Portland cement with alumina cement and a rapid hardening portland cement.

Also, the construction method according to the present disclosure may further use calcium chloride as a cement curing-accelerator and calcium formate as a cement curing-acceleration aid, which can accelerate a complex formation between cement and polymer and make the construction of mortar possible even at a temperature of below zero (less than 0° C.), thereby solving the degradation of construction reliability in winter.

EXAMPLES

Hereinafter, the present disclosure will be described in more detail with reference to the following preferred examples. However, these examples are provided for illustrative purposes only and are not be construed as in any way limiting the invention.

Embodiments that are not described herein will be readily recognized and appreciated by those skilled in the art, and thus explanation thereof is omitted 1. Preparation of Specimens Example 1

26 wt % of Portland cement, 2 wt % of an alumina cement, 1.85 wt % of a rapid hardening portland cement, 49 wt % of quartz sand, 15 wt % of calcium carbonate, 5 wt % of a polymer emulsion, 0.3 wt % of calcium chloride, 0.5 wt % of calcium formate, 0.20 wt % of methyl cellulose, and 0.15 wt % of methyl ethyl cellulose were mixed by using anon-gravitational powder mixer for 10 minutes to obtain a homogeneous mixture powder. 100 g of the mixture powder was further mixed with 20 mL of water by using a motor mixer for 6 minutes to prepare a mortar composition. The mortar composition was dried at 60° C. and then cut in 3 cm (width)×3 cm (length)×3 cm (thickness) to obtain a specimen.

Example 2

A specimen was obtained in the same manner as in Example 1 with the exception that the Portland cement, the alumina cement and the rapid hardening portland cement were added in contents of 27 wt %, 2.5 wt % and 2.25 wt %, respectively.

Example 3

A specimen was obtained in the same manner as in Example 1 with the exception that calcium chloride and calcium formate were added in contents of 0.4 wt % and 0.4 wt %, respectively.

Comparative Example 1

A specimen was obtained in the same manner as in Example 1 with the exception that the Portland cement was added in a content of 28.25 wt %, and the alumina cement and the rapid hardening portland cement were not added.

Comparative Example 2

A specimen was obtained in the same manner as in Example 1 with the exception that the Portland cement was added in a content of 27.85 wt % and the rapid hardening portland cement was not added.

2. Evaluation of Properties

The specimens obtained in Examples 1 to 3 and Comparative Examples 1 and 2 were evaluated for their properties and the results are shown in Table 1.

(1) A compressive strength was measured based on KS L 5015.
(2) A bond strength was measured based on KS F 4715.
(3) A tensile strength was measured based on KS L 5104.
(4) An absorption amount was measured based on the KS F 2451. In this test, each specimen was dipped in water for 24 hours, and an absorption amount was measured by calculating the difference in the weight of the specimen before and after the test.

TABLE 1

| Items | Compressive strength (kgf/cm$^2$) | Tensile strength (kgf/cm$^2$) | Bond strength (kgf/cm$^2$) | Absorption amount (g) |
|---|---|---|---|---|
| Example 1 | 561 | 27 | 27 | 0.3 |
| Example2 | 563 | 26 | 28 | 0.2 |
| Example3 | 594 | 24 | 26 | 0.3 |
| Comparative Example 1 | 549 | 18 | 25 | 0.2 |
| Comparative Example 2 | 567 | 16 | 24 | 0.3 |

As shown in Table 1, it can be seen that the specimens obtained in Examples 1 to 3 have a noticeably higher tensile strength than those obtained in Comparative Examples 1 and 2. It seems that the reason why the specimens of Comparative Examples 1 and 2 have lower tensile strengths than those of Examples 1 to 3 is because of not using at least one of an alumina cement and a rapid hardening portland cement in Comparative Examples 1 and 2.

Moreover, it can be seen that the specimens of Examples 1 to 3 were measured to have similar compressive strength and absorption amount with those of Comparative Examples 1 and 2 but a slightly higher bond strength than those of Comparative Examples 1 and 2.

Although the present disclosure has been described with reference to embodiments, they are merely illustrative. It will be appreciated by those skilled in the art that various modifications and equivalents are possible without departing from the scope of the present disclosure. Accordingly, the true scope sought to be protected is defined solely by the claims.

The invention claimed is:

1. An exterior insulation mortar for cold weather comprising 27 to 30 wt % of Portland cement, 1 to 3 wt % of an alumina cement, 1 to 3 wt % of a rapid hardening portland cement, 40 to 50 wt % of quartz sand, 12 to 16 wt % of calcium carbonate, 5 to 7 wt % of a polymer binder, 0.2 to 0.8 wt % of a cement curing-accelerator, 0.3 to 0.7 wt % of a cement curing-acceleration aid, 0.15 to 0.25 wt % of methyl cellulose, and 0.1 to 0.2 wt % of methyl ethyl cellulose.

2. The exterior insulation mortar for cold weather of claim 1, wherein the polymer binder comprises at least one selected from the group consisting of an acrylic resin, an EVA (ethylene vinyl acetate) resin and a polymer emulsion.

3. The exterior insulation mortar for cold weather of claim 1, wherein the cement curing-accelerator is calcium chloride ($CaCl_2$).

4. The exterior insulation mortar for cold weather of claim 1, wherein the cement curing-acceleration aid is calcium formate.

5. The exterior insulation mortar for cold weather of claim 1, wherein the exterior insulation mortar has a tensile strength of 20 to 28 $kgf/cm^2$.

6. A method for constructing an exterior insulation system for cold weather, comprising the steps of:
 forming an adhesive mortar by coating an adhesive mortar composition on an outer wall of concrete walls, followed by curing;
 attaching an insulating material to the outer wall of concrete walls by the adhesive mortar; and
 forming a protective mortar by coating a protective composition on an outer wall of the insulating material, followed by curing,
 wherein the adhesive mortar and the protective mortar each comprises 27 to 30 wt % of Portland cement, 1 to 3 wt % of an alumina cement, 1 to 3 wt % of a rapid hardening portland cement, 40 to 50 wt % of quartz sand, 12 to 16 wt % of calcium carbonate, 5 to 7 wt % of a polymer binder, 0.2 to 0.8 wt % of a cement curing-accelerator, 0.3 to 0.7 wt % of a cement curing-acceleration aid, 0.15 to 0.25 wt % of methyl cellulose, and 0.1 to 0.2 wt % of methyl ethyl cellulose.

7. The method for constructing an exterior insulation system of claim 6, wherein the cement curing-accelerator is calcium chloride ($CaCl_2$) and the cement curing-acceleration aid is calcium formate.

8. The method for constructing an exterior insulation system of claim 6, further comprising the step of attaching a finishing material to an outer wall of the protective mortar, after the step of forming the protective mortar.

* * * * *